Patented Feb. 18, 1941

2,232,295

UNITED STATES PATENT OFFICE 2,232,295

PROCESS FOR TREATING LIQUIDS

Oliver M. Urbain and William R. Stemen, Columbus, Ohio, assignors to Charles H. Lewis, Harpster, Ohio No Drawing. Application July 14, 1938, Serial No. 219,281

8 Claims. (Cl. 210—2)

This invention relates to the purification of polluted liquids. More particularly, it relates to precipitation processes for separating polluting substances from liquids and industrial wastes, and removing in general all organic matter present in polluted liquids.

It has been recognized that polluting organic substances are present in liquids in three phases, namely, (1) as suspended matter, (2) as colloidal matter, and (3) as matter in true solution. A complete purification of a liquid requires the elimination therefrom of the organic matter present in each of these forms.

The relative putrescibility of the different fractions of the organic matter present in a polluted liquid is indicated by the percent of the ten-day bio-chemical oxygen demand attributable to each fraction. In normal sewage these percentages are about as follows:

Suspended matter__35% of the 10-day B.O.D.
Colloidal matter____53% of the 10-day B.O.D.
Dissolved matter___12% of the 10-day B.O.D.

Processes for the removal of suspended, colloidal and dissolved matter have heretofore been proposed and have met with a modicum of success. These processes, in general, effect removal of organic matter by coagulation of suspended particles consisting of or having adsorbed thereon the organic matter.

For example, the organic materials in true solution are adsorbed by utilizing an adsorbing agent which is susceptible of coagulation. Certain adsorbents having a sufficient active surface and adsorption capacity are used in proper proportions to effect a substantially complete adsorption of the organic matter in true solution from a polluted liquid. Such an adsorbent agent must be one which is susceptible of coagulation, and possesses the property of holding the adsorbed material during the coagulation step.

The organic matter present in colloidal form may be effectively removed by first flocculating such organic matter and thereafter coagulating the suspended matter formed by the flocculation. The flocculation is effected by adding a desolvator, making the liquid alkaline and adding an efficient electrolyte. The colloids in the alkaline solutions bear high negative charges, and the addition of an electrolyte provides positive ions which combine with the negatively charged colloids and flocculate such colloids in the form of suspended matter.

The removal of suspended matter in such liquid is commonly effected by adding thereto a coagulant which gathers together the suspended particles. Such a process is termed coagulation. It will thus be seen that by effecting flocculation of the colloid, and adsorption of the matter in true solution, in the presence of the normally suspended matter, all of the organic matter is brought into a state of suspension which may thereafter be coagulated by the addition of a suitable coagulant.

It is well known that in processes involving coagulation of suspended matter, a period of from two to four hours is required for the precipitate to settle sufficiently before the purified liquid can be drawn off. The sedimentation period required varies with the type of coagulant employed. Of the common coagulants employed, the aluminum and ferric salts produce a precipitate which settles at a slower rate than that produced by ferrous salts. Aluminum coagulants are the most common in liquid treatment processes and these require a sedimentation period of from three to four hours. This necessitates sedimentation basins of enormous capacity where large quantities of liquids are processed. The activated sludge processes and the biological processes require sedimentation tanks of even greater capacity. A further problem met with in the known processes of coagulation is the large volume of sludge obtained by such methods.

It is an object of this invention to provide a process by which organic materials in true solution in a polluted liquid may be adsorbed. A further object of this invention is to provide a process by which the removal of the adsorbed organic materials and the adsorbing agents may be facilitated. A further object of this invention is to provide processes by which organic matter in true solution may be removed from rapidly flowing water.

Other and further objects of the invention will become apparent as the description of the process is developed.

In our copending application Serial No. 218,219, filed July 8, 1938, it has been shown that through the use of magnetic materials, such as natural and artificial magnetites, iron, cobalt, nickel, and alloys of these metals, organic materials which have been converted into suspended matter may be much more rapidly coagulated in the form of a sludge having a much smaller volume for the same quantity of organic materials removed. The sedimentation of the suspended matter is effected by adding such magnetic materials thereto and employing an electro-magnetic field below the sedimentation tanks to carry down the magnetic and suspended matter.

It has now been discovered that through the use of natural magnetite, not only may the sedimentation be advantageously effected by magnetic attraction, but that the removal of organic materials in true solution may be effected by adsorption, thus eliminating the necessity of employing adsorbent materials such as Cottrell dust, carbonaceous shale, and Bessemer slug. Natural magnetite possesses a high adsorption capacity which, as we have found, when combined with its magnetic properties, make it a particularly advantageous material for use in removing organic matter in true solution as well as organic matter in suspended form.

It thus becomes an effective water purification agent capable of removing organic matter in true solution by adsorption and due to its magnetic properties, capable of facilitating the coagulation of the natural occurring suspended matter, the suspended matter resulting from desolvation and flocculation of colloidal organic matter and the suspended matter containing the adsorbed organic particles, when employed in connection with an electro-magnetic field. A more detailed description of this newly discovered process now follows.

To effect adsorption of organic materials in true solution and magnetic flocculation of suspended material, the usual coagulating agents such as ferrous sulfate, aluminum sulfate, sodium aluminate, chlorinated copperas, etc., are added to the liquid containing such materials and there is additionally added a quantity of powdered natural magnetite. The equantity employed will vary depending upon the quantity of suspended materials to be coagulated and the quantity of organic matter in true solution, but it has been found that the addition of 200 to 500 pounds per million gallons of liquid being treated is sufficient for the average sewage or polluted liquid.

Magnetite is a ferroso-ferric oxide having the formula $FeO.Fe_2O_3$, i. e., a combination of ferrous and ferric oxides. It is a very cheap iron ore widely distributed in nature. It is also a waste product of many mining operations and a waste by-product of a number of metallurgical processes.

An electro-magnet is installed in the bottom of the settling tank, and is utilized to effect the magnetic flocculation. The rate of settling of the floc will depend upon the intensity of the magnetic field and the depth of the tank. Electro-magnets exerting a considerable magnetic field are commercially available and may be utilized in this process. The electro-magnets may be constructed as baffle plates, grid-type plates, or in any suitable design to conform with the tank design. The magnetic field should be of such area as to cover the entire bottom of the sedimentation tank. The electro-magnet may be stationary or movable. If it is desired to move the coagulated sediment to a definite location in the tank, this can be done with movable magnets. It has been found advantageous to employ soft core magnets which are magnetized only while being supplied current. This makes possible the control of the movement of the sludge and permits the sludge to be released when this is desired.

The great rapidity of purification by a natural magnetite under the influence of an electro-magnet is shown by the following representative set of results:

EXAMPLE 1

One thousand parts of sewage was treated with four parts of a ferric chloride solution and agitated for four minutes. Ferric chloride was employed as the coagulant because it is in common general use for both potable and polluted waters. The customary proportional parts of Cottrell dust and hydrated lime were added to sample A and the mixture agitated for four minutes. In samples B and C, natural magnetite was substituted for the Cottrell dust. Sample C was placed in the field of an electro-magnet. Measurement of the rate of settling of the floc in centimeters at definite time intervals was made on each of the three samples. At the end of the settling period, the volume of sludge was measured for each sample. The results are tabulated in Table 1 below:

Table 1

|  | A | B | C |
|---|---|---|---|
| 0.5 min............centimeters.. | 0.2 | 0.2 | 2.0 |
| 1.0 min............do.... | 2.0 | 2.5 | 5.0 |
| 2.0 min............do.... | 3.0 | 3.5 | 8.0 |
| 5.0 min............do.... | 6.5 | 6.5 | ...... |
| 10.0 min............do.... | 7.0 | 7.5 | ...... |
| 15.0 min............do.... | 8.0 | 8.0 | ...... |
| Volume of sludge............parts.. | 98.0 | 70.0 | 36.8 |

This data shows that complete sedimentation was effected in less than two minutes when the magnetic flocculation was carried on in the field of an electro-magnet, as compared with a period of fifteen minutes required for complete sedimentation when not carried on in a magnetic field. It also shows that, through the use of a natural magnetite in place of conventional adsorbents, the sludge was reduced in volume even without the use of a magnetic field showing the advantageous nature of natural magnetite as a coagulation aid. Tests of B. O. D. of the treated samples indicated a more complete removal of organic matter in true solution in samples B and C than in sample A, thus showing the efficiency of natural magnetite in comparison with conventional adsorbents.

An examination of the sludge produced by magnetic flocculation indicated that this form of sludge is much easier to handle than that produced by other coagulation processes. Thus through the use of a natural magnetite, the period of sedimentation is reduced from 75% to 90%, the volume of sludge obtained is reduced by 65%, a satisfactory removal of organic matter in true solution is effected, and the sludge produced is of a quality which makes it much more easily handled.

If the use of natural magnetite as the adsorbent and magnetic material is accompanied by the use of a desolvator, lime and an electrolyte, a highly satisfactory process for removal of all polluting substances results. Ferric chloride, when employed as the desolvator, appears to in no way affect the adsorption properties of natural magnetite and accordingly the organic matter in true solution may be removed by adsorption. By treatment of the polluted liquid with a desolvator and then with lime, the colloidal organic matter is desolvated and negatively charged, and the addition of a suitable electrolyte serves to flocculate the colloids into suspensoids. Ferric chloride will hydrolyze to form hydrous ferric oxide which serves as an efficient desolvator. Thus, upon the addition of lime and a suitable electrolyte, the colloidal organic matter is readily converted into suspended matter. Finely divided natural magnetite is added to effect adsorption of organic matter in true solution and to add magnetic properties for coagulation purposes. The de-flocculated organic colloids in the form of suspended matter thus become intimately mixed with suspended particles of magnetite. The remaining organic matter in the polluted liquid will be present as suspended matter. Accordingly, the resultant liquid contains magnetites and organic matter, all of which is present in suspended form. To this mixture may be added the usual coagulants such as aluminum ferric and ferrous salts, to bring about the coagulation process. A magnetic field may then be applied to the liquid being treated which results in the rapid precipitation of the flocs formed by the coagulation. The precipitate produced by the coagulants will, with the aid of the magnetic field, form a sludge within a very short period of time. The sludge obtained in this manner will be found to have a volume approximately 25% of the volume of sludge normally obtained by coagulation methods not employing magnetic material, and will contain the organic materials responsible for the B. O. D. of the polluted liquids being treated.

It is to be expressly understood that the foregoing description is exemplary only and that the scope of this invention is not to be limited thereby beyond the scope of the subjoined claims.

Having thus described our invention, we claim:

1. A process for treating liquids containing organic impurities which comprises adding thereto powdered natural magnetite, and precipitating said magnetite and impurities by means of a magnetic field.

2. A process for removing organic matter in true solution from a liquid which comprises adding thereto powdered natural magnetite to adsorb said organic matter, adding a coagulating material to coagulate the natural magnetite with adsorbed organic matter, and precipitating the mixture thus formed by means of a magnetic field.

3. A process for removing suspended organic matter from a liquid which comprises adding thereto a coagulating material and a powdered natural magnetite to form a mixture of coagulated suspended organic matter and said natural magnetite, and precipitating said mixture by means of a magnetic field.

4. A process for removing colloidal organic matter from a liquid which comprises adding thereto an electrolyte and lime to desolvate and flocculate said organic matter, adding a coagulating material and a powdered natural magnetite to form a mixture of coagulated flocculated organic matter and said natural magnetite, and precipitating said mixture by means of a magnetic field.

5. A process for removing organic matter from a liquid which comprises adding thereto powdered natural magnetite to adsorb organic matter in true solution and a coagulating material for suspended organic matter, to form thereby a mixture of coagulated natural magnetite with adsorbed organic matter and coagulated suspended organic matter, and precipitating said mixture by means of a magnetic field.

6. A process for removing organic matter from a liquid which comprises adding thereto an electrolyte and lime to desolvate and flocculate collidal organic matter, powdered natural magnetite to adsorb organic matter in true solution and a coagulating material, to form thereby a mixture of coagulated flocculated organic matter and coagulated natural magnetite with adsorbed organic matter, and precipitating said mixture by means of a magnetic field.

7. A process for removing organic matter from a liquid which comprises adding thereto an electrolyte and lime to desolvate and flocculate colloidal organic matter, a coagulating material for suspended organic matter, and powdered natural magnetite to form thereby a mixture of coagulated flocculated organic matter, coagulated suspended organic matter and natural magnetite, and precipitating said mixture by means of a magnetic field.

8. A process for removing organic matter from a liquid which comprises adding thereto an electrolyte and lime to desolvate and flocculate the colloidal organic matter in said liquid, powdered natural magnetite to adsorb organic matter in true solution, and a coagulating material for suspended organic matter, to form thereby a mixture of coagulated flocculated organic matter, coagulated natural magnetite with adsorbed organic matter and coagulated suspended organic matter, and precipitating said mixture by means of a magnetic field.

OLIVER M. URBAIN.
WILLIAM R. STEMEN.